(12) United States Patent
Tracy et al.

(10) Patent No.: US 7,004,428 B2
(45) Date of Patent: Feb. 28, 2006

(54) LIFT AND TWIST CONTROL USING TRAILING EDGE CONTROL SURFACES ON SUPERSONIC LAMINAR FLOW WINGS

(75) Inventors: Richard R. Tracy, Carson City, NV (US); James D. Chase, Reno, NV (US)

(73) Assignee: Aerion Corporation, Reno, CA (US)

( * ) Notice: Subject to any disclaimer, the term of this patent is extended or adjusted under 35 U.S.C. 154(b) by 0 days.

(21) Appl. No.: 10/762,083

(22) Filed: Jan. 20, 2004

(65) Prior Publication Data

US 2005/0151029 A1 Jul. 14, 2005

Related U.S. Application Data

(60) Provisional application No. 60/441,934, filed on Jan. 24, 2003.

(51) Int. Cl.
*B64C 9/06* (2006.01)
(52) U.S. Cl. .................................................. 244/35 R
(58) Field of Classification Search .............. 244/35 R, 244/211, 212
See application file for complete search history.

(56) References Cited

U.S. PATENT DOCUMENTS

| 3,188,022 | A | * | 6/1965 | Torsten ..................... 244/45 A |
| 3,204,895 | A | | 9/1965 | Razak |
| 3,870,253 | A | * | 3/1975 | Leirdy et al. .................. 244/46 |
| 4,146,200 | A | * | 3/1979 | Borzachillo ............... 244/75 R |
| 4,165,058 | A | | 8/1979 | Whitener |
| 4,180,224 | A | | 12/1979 | Ryle, Jr. |
| 4,725,020 | A | | 2/1988 | Whitener |
| 5,082,207 | A | * | 1/1992 | Tulinius ................... 244/76 R |
| 5,088,661 | A | | 2/1992 | Whitener |
| 5,518,204 | A | * | 5/1996 | Tracy .......................... 244/36 |
| 5,740,991 | A | | 4/1998 | Gleine et al. |
| 5,875,998 | A | | 3/1999 | Gleine et al. |
| 5,897,076 | A | * | 4/1999 | Tracy ..................... 244/117 A |
| 5,984,229 | A | * | 11/1999 | Hollowell et al. ......... 244/12.4 |

* cited by examiner

*Primary Examiner*—Tien Dinh
(74) *Attorney, Agent, or Firm*—William W. Haefliger

(57) ABSTRACT

An aircraft includes a fuselage, thin supersonic wings on the fuselage, there being trailing edge flaps carried by the wings, the flaps configured to provide flap deflection to simultaneously control wing twist and to reduce drag, when the aircraft is operated at subsonic flight conditions.

3 Claims, 3 Drawing Sheets

Figure 1:
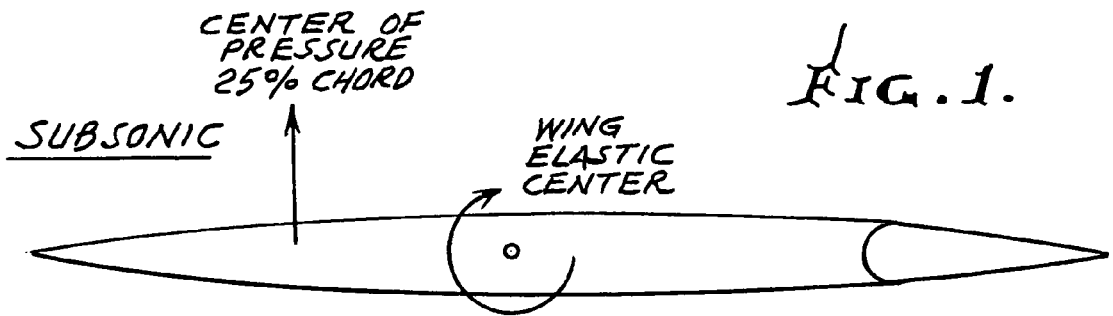

LIFT AND TWIST CONTROL USING TRAILING EDGE CONTROL SURFACES ON SUPERSONIC LAMINAR FLOW WINGS

BACKGROUND OF THE INVENTION

This application is a non-provisional application based on provisional application Ser. No. 60/441,934, filed Jan. 24, 2003.

Supersonic aircraft designed with thin, low sweep wings designed for extensive natural laminar flow tend to have low torsional stiffness. In subsonic flight the center of pressure is typically ahead of the wing torsional elastic center creating a moment twisting the wingtip to higher angle of attack—"wash-in". At supersonic conditions the center of pressure is much closer to the wing elastic center, reducing or reversing the "wash-in". A wing with a twist distribution optimized for supersonic cruise will thus have significant "wash-in" at subsonic speeds. This induces pre-mature tip stall, reducing the maximum achievable wing lift and creating undesirable control characteristics, at stall.

Thin supersonic airfoil sections with low camber also have significant drag penalties at subsonic conditions due leading edge vortex drag. This penalty increases at high subsonic Mach number cruise conditions with a pronounced drag rise.

There is need for improvements in thin, supersonic wings, as disclosed herein.

SUMMARY OF THE INVENTION

The above described problems and difficulties can be mitigated by deflection of trailing edge control surfaces on such supersonic aircraft. A trailing edge flap has the effect of moving the center of pressure aft, thus reducing the wash-in effect when deployed at subsonic speeds. The trailing edge flaps also introduce aft camber which reduces subsonic leading edge vortex drag and compressibility drag rise.

The present invention provides trailing edge flaps on thin supersonic wings with deflections scheduled to simultaneously control wing twist and reduce drag when operated at subsonic conditions. The surfaces of the flaps can be deflected either statically or dynamically to control twist and drag. For a static system, deflection can be set based on the nominal flight condition much as conventional landing flaps. Dynamic operation involves a closed loop feedback system which continuously monitors flight conditions and wing twist to minimize drag and/or suppress dynamic wing deflections such as divergence or flutter.

Accordingly, it is a major object of the invention to provide an aircraft comprising
 a) a fuselage,
 b) thin supersonic wings on the fuselage,
 c) there being trailing edge flaps carried by the wings,
 d) said flaps configured to provide flap deflection to simultaneously control wing twist and to reduce drag, when the aircraft is operated at subsonic flight conditions.

As shown in the drawings, and as described, there are at least four of said trailing edge flaps located in spanwise sequence along each wing, and wherein at subsonic flight conditions the flap or flaps located progressively relatively closer to the fuselage has or have progressively a greater downward deflection relative to the wing than the flap or flaps relatively closer to the wing tip, and at supersonic flight conditions all of said flaps have relatively faired positions relative to the wing.

As will be seen, the wings may typically have low sweep angularity relative to the fuselage to provide substantial laminar airflow, the wings further characterized as having relatively low torsional stiffness.

Further, the wings are typically characterized as having
 a) a center of pressure, at subsonic flight conditions,
 b) a torsional elastic center. Flap deflection is provided such that the center of pressure is substantially closer to said torsional elastic center under subsonic flight conditions, than in the absence of said flaps.

Another object is to provide flaps that are characterized by camber acting to reduce subsonic wing leading edge vortex drag, and compressibility drag increase.

Yet another object is to provide means for monitoring wing twist, and to control flap angularity to reduce said twist, thereby providing closed loop feed back. A control system is typically provided to monitor flight conditions including air speed, and to position the flaps.

These and other objects and advantages of the invention, as well as the details of an illustrative embodiment, will be more fully understood from the following specification and drawings, in which:

DRAWING DESCRIPTION

Figure 2:
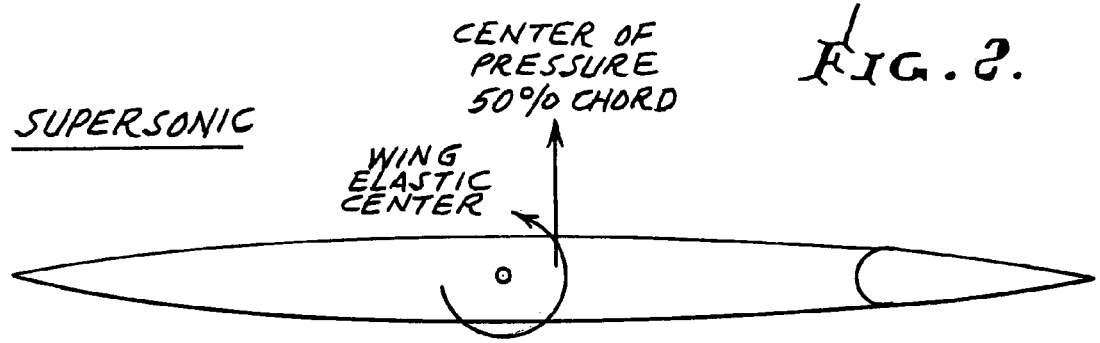
Figure 3:
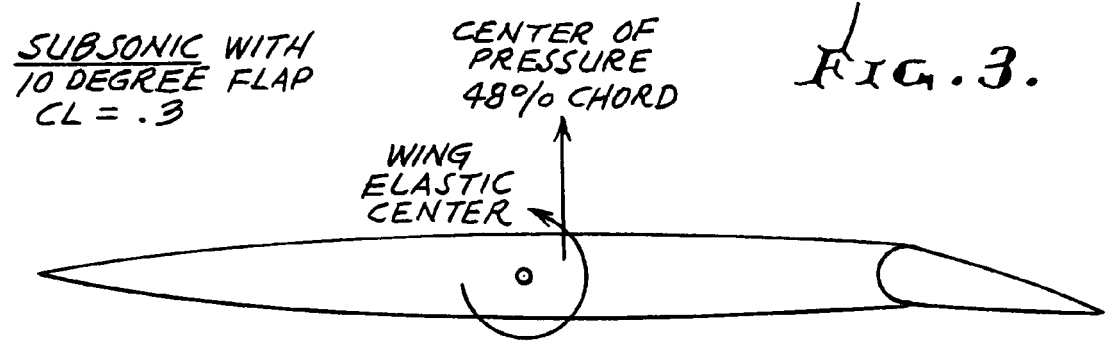
Figure 4:
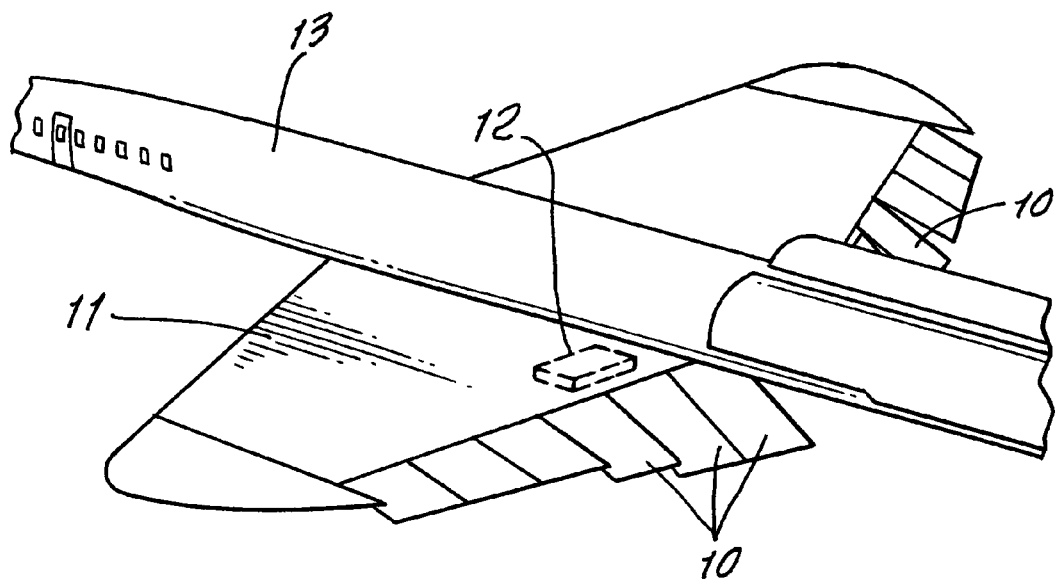
Figure 5:
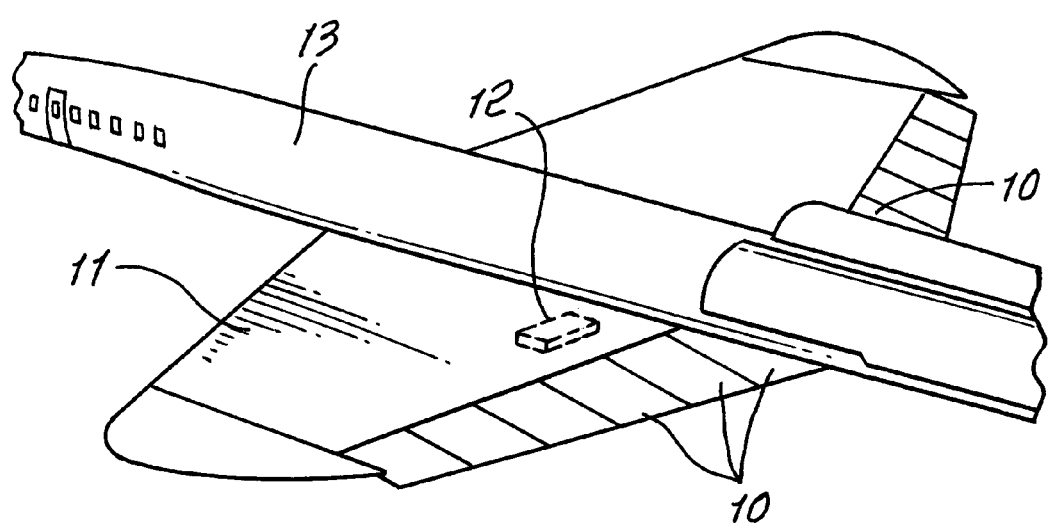
Figure 6:
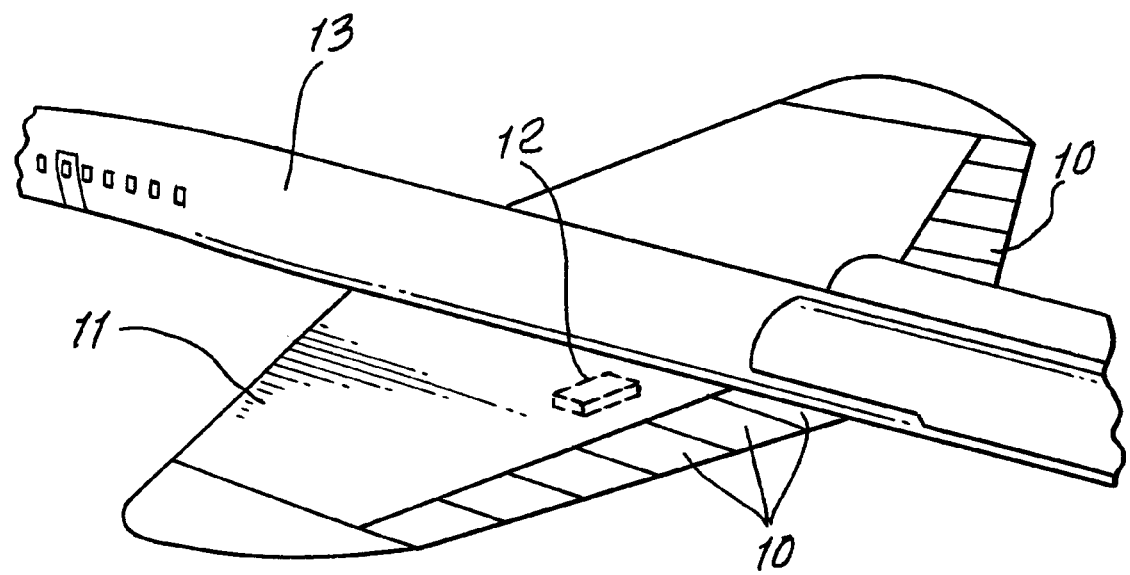

FIGS. 1–3 schematically show wing chord, and flap configuration;

FIGS. 4 and 6 show aircraft with supersonic wing and flap configuration, wherein FIG. 4 shows flaps during landing; FIG. 5 shows flaps during subsonic cruise condition; and FIG. 6 shows flaps during supersonic cruise conditions.

DETAILED DESCRIPTION

FIGS. 1–3 illustrate the conditions referred to above. To repeat, supersonic aircraft designed with thin, low sweep wings designed for extensive natural laminar flow tend to have low torsional stiffness. In subsonic flight (see FIG. 1) the center of pressure is typically ahead of the wing torsional elastic center creating a moment twisting the wingtip to higher angle of attack—"wash-in". At supersonic conditions (see FIG. 2) the center of pressure is much closer to the wing elastic center, reducing or reversing the "wash-in". A wing with a twist distribution optimized for supersonic cruise will thus have significant "wash-in" at subsonic speeds. This induces pre-mature tip stall, reducing the maximum achievable wing lift and creating undesirable control characteristics, at stall.

The present invention provides trailing edge flaps 10 on thin supersonic wings 11 with deflections scheduled to simultaneously control wing twist and reduce drag when operated at subsonic conditions. The surfaces can be deflected either statically or dynamically to control twist and drag. For a static system, deflection would be set based on the nominal flight condition much as conventional landing flaps. Dynamic operation would involve a closed loop feedback system which continuously monitors flight conditions and wing twist to minimize drag and/or suppress dynamic wing deflections such as divergence or flutter. See flap controls 12 (schematics) in FIGS. 4 and 5.

Nominal positions for flap deflection are illustrated in FIGS. 4 and 5. Trailing edge surfaces are deflected modestly for typical subsonic conditions. Landing and takeoff involve greater deflection as is typical of conventional aircraft. For supersonic cruise they would be faired. See FIGS. 4–6. The fuselage is indicated at 13.

In summary, the aircraft of the invention has:
a) a fuselage
b) thin supersonic wings on the fuselage,
c) trailing edge flaps carried by the wings,
d) the flaps configured to provide flap deflection to simultaneously control wing twist and to reduce drag, when the aircraft is operated at subsonic flight conditions.

Typically, the wings have low sweep angularity relative to the fuselage to provide substantial laminar airflow, the wings further characterized as having relatively low torsional stiffness.

The wings are further characterized as having
d) a center of pressure, at subsonic flight conditions,
e) a torsional elastic center, and wherein in the absence of flap deflection at subsonic flight condition the center of pressure is forward of said torsional elastic center, tending to create moments of force acting to twist the wing tip to higher angles of attack.

In the absence of such flap deflection the center of pressure is substantially closer to said torsional elastic center, under supersonic flight conditions, than under subsonic flight conditions. Further, the center of pressure is substantially closer to the torsional elastic center under subsonic flight conditions, than in the absence of such flaps.

Further, the flaps provide camber acting to reduce subsonic wing leading edge vortex drag, and compressibility drag increase.

The invention also provides means for monitoring wing twist, and to control flap angularity to reduce said twist, thereby providing closed loop feed back. A control system or systems maintains the flaps positioned to control twist and drag, at subsonic flight conditions. The control system or systems is configured to monitor flight conditions including air speed, and to position the flaps, as described.

We claim:
1. An aircraft comprising
   a) a fuselage
   b) thin supersonic wings on the fuselage, the wings having tips, and sharp leading edges,
   c) there being trailing edge flaps carried by the wings,
   d) said flaps configured to provide flap deflection to simultaneously control wing twist and to reduce drag, when the aircraft is operated at subsonic flight conditions,
   e) and said wings have low sweep angularity relative to the fuselage to provide substantial laminar airflow, the wings further characterized as having relatively low torsional stiffness,
   f) there being multiple of said trailing edge flaps located in spanwise sequence along each wing, and wherein at subsonic flight conditions the flap or flaps located progressively relatively closer to the fuselage has or have progressively a greater downward deflection relative to the wing than the flap or flaps relatively closer to the wing tip, and at supersonic flight conditions all of said flaps have relatively faired positions relative to the wing,
   g) and wherein the wings are further characterized as having
      $x_1$ center of pressure, at subsonic flight conditions,
      $x_2$ a torsional elastic center, and wherein in the absence of said flap deflection at subsonic flight conditions said center of pressure is substantially forward of said torsional elastic center, tending to create moments of force acting to twist the wing tip to higher angles of attack,
   h) and wherein in the absence of said provided flap deflection said center of pressure at near about half of wing chord dimension is substantially closer to said torsional elastic center, under supersonic flight conditions, than under subsonic flight conditions,
   i) and wherein with said provided flap deflection the center of pressure at near about half of wing chord dimension is substantially closer to said torsional elastic center under subsonic flight conditions, than in the absence of said provided flap deflection,
   j) and wherein said flaps provide means including camber for reducing subsonic wing leading edge vortex drag, and reducing compressibility drag,
   k) and including means to control flap deflection angularity to reduce said twist.

2. The aircraft of claim 1 wherein said means to control flap deflection angularity to reduce twist includes a control system or systems to maintain the flaps positioned to control twist and drag, at subsonic flight conditions.

3. The aircraft of claim 2 wherein the control system or systems is configured to monitor flight conditions including air speed, and to position the flaps.

* * * * *